(12) United States Patent
Ogasawara et al.

(10) Patent No.: US 12,510,643 B2
(45) Date of Patent: Dec. 30, 2025

(54) ULTRASONIC DIAGNOSTIC APPARATUS AND PROBE INSPECTION APPARATUS

(71) Applicant: CANON MEDICAL SYSTEMS CORPORATION, Otawara (JP)

(72) Inventors: Yoichi Ogasawara, Nasushiobara (JP); Yutaka Kobayashi, Nasushiobara (JP); Minori Ohashi, Otawara (JP)

(73) Assignee: CANON MEDICAL SYSTEMS CORPORATION, Otawara (JP)

(*) Notice: Subject to any disclaimer, the term of this patent is extended or adjusted under 35 U.S.C. 154(b) by 406 days.

(21) Appl. No.: 18/160,346

(22) Filed: Jan. 27, 2023

(65) Prior Publication Data

US 2023/0243946 A1 Aug. 3, 2023

(30) Foreign Application Priority Data

Jan. 31, 2022 (JP) .................. 2022013075

(51) Int. Cl.
*G01S 7/52* (2006.01)
*A61B 8/00* (2006.01)
*G01S 15/89* (2006.01)

(52) U.S. Cl.
CPC .......... *G01S 7/5205* (2013.01); *A61B 8/4444* (2013.01); *A61B 8/4494* (2013.01); *A61B 8/58* (2013.01); *G01S 15/8915* (2013.01)

(58) Field of Classification Search
CPC . G01S 7/5205; G01S 15/8915; A61B 8/4444; A61B 8/4494; A61B 8/58
See application file for complete search history.

(56) References Cited

U.S. PATENT DOCUMENTS

| 2014/0043933 A1* | 2/2014 | Belevich .................. A61B 8/12 367/7 |
| 2017/0290567 A1* | 10/2017 | Fujita ..................... A61B 8/488 |
| 2022/0079566 A1 | 3/2022 | Makita et al. |

FOREIGN PATENT DOCUMENTS

| JP | 2017-185129 A | 10/2017 |
| JP | 2022-47251 A | 3/2022 |

\* cited by examiner

*Primary Examiner* — David Z Huang
(74) *Attorney, Agent, or Firm* — Oblon, McClelland, Maier & Neustadt, L.L.P.

(57) ABSTRACT

In one embodiment, an ultrasonic diagnostic apparatus includes an ultrasonic probe and a a main body. The ultrasonic probe includes at least a plurality of ultrasonic transducers arranged in an array and an ultrasonic lens. The main body inspects the ultrasonic probe by using a reflected signal from an interface between the ultrasonic lens and air, and includes inspection processing circuitry. The inspection processing circuitry is configured to: sequentially select an ultrasonic transducer to be inspected from the plurality of ultrasonic transducers one by one in such a manner that any two ultrasonic transducers being continuously selected are not spatially adjacent but are separated by a predetermined separation distance; cause the selected ultrasonic transducer to transmit an ultrasonic pulse; and sequentially inspect each of the plurality of ultrasonic transducers by acquiring a reflected signal responding to transmission of the ultrasonic pulse from the interface.

11 Claims, 13 Drawing Sheets

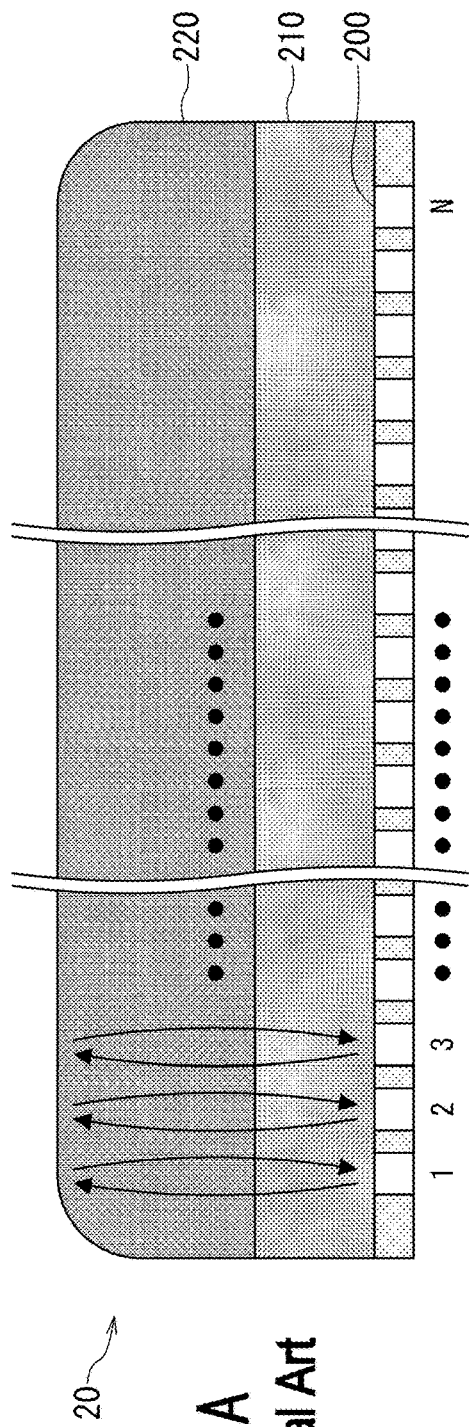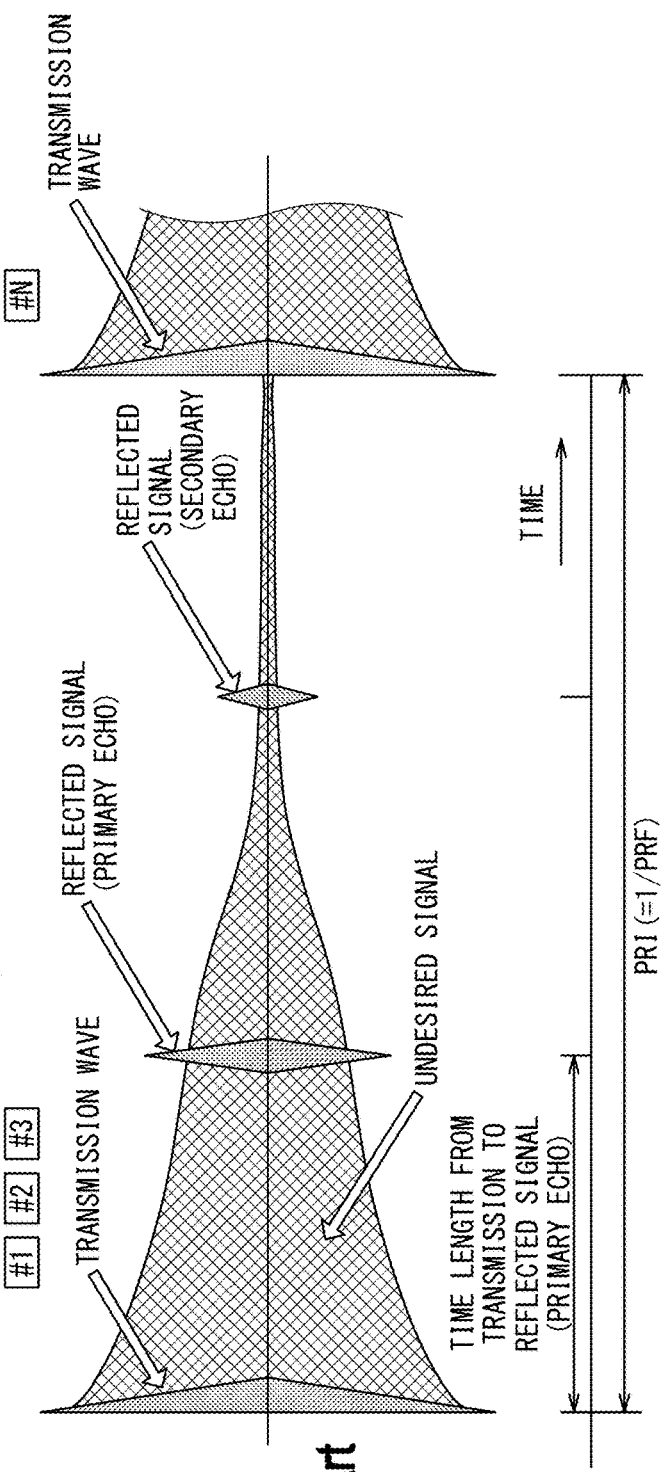
FIG. 3A Conventional Art
FIG. 3B Conventional Art

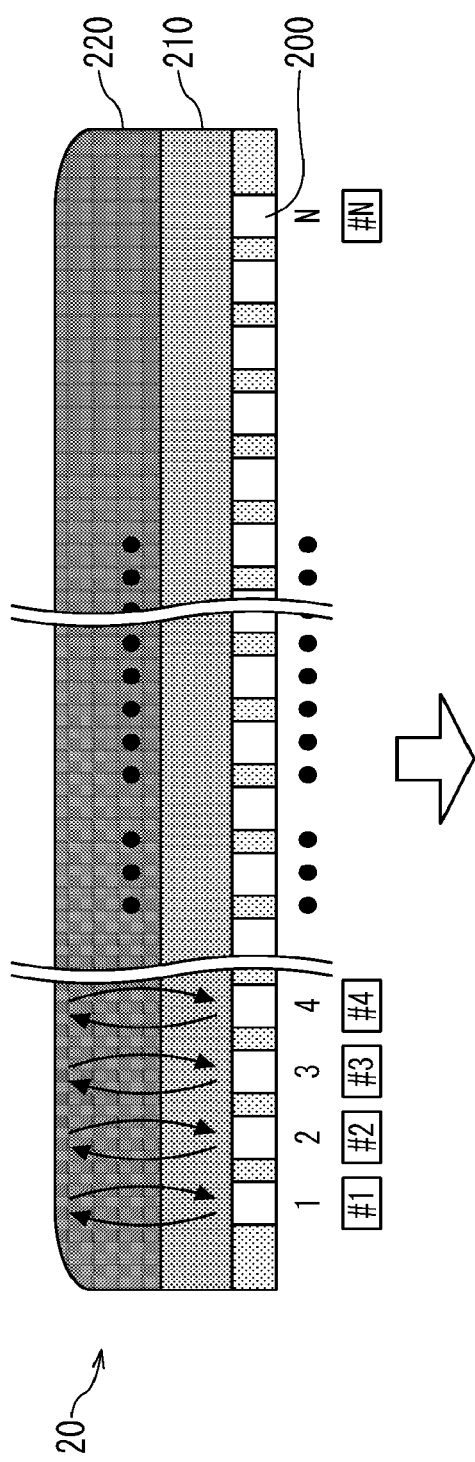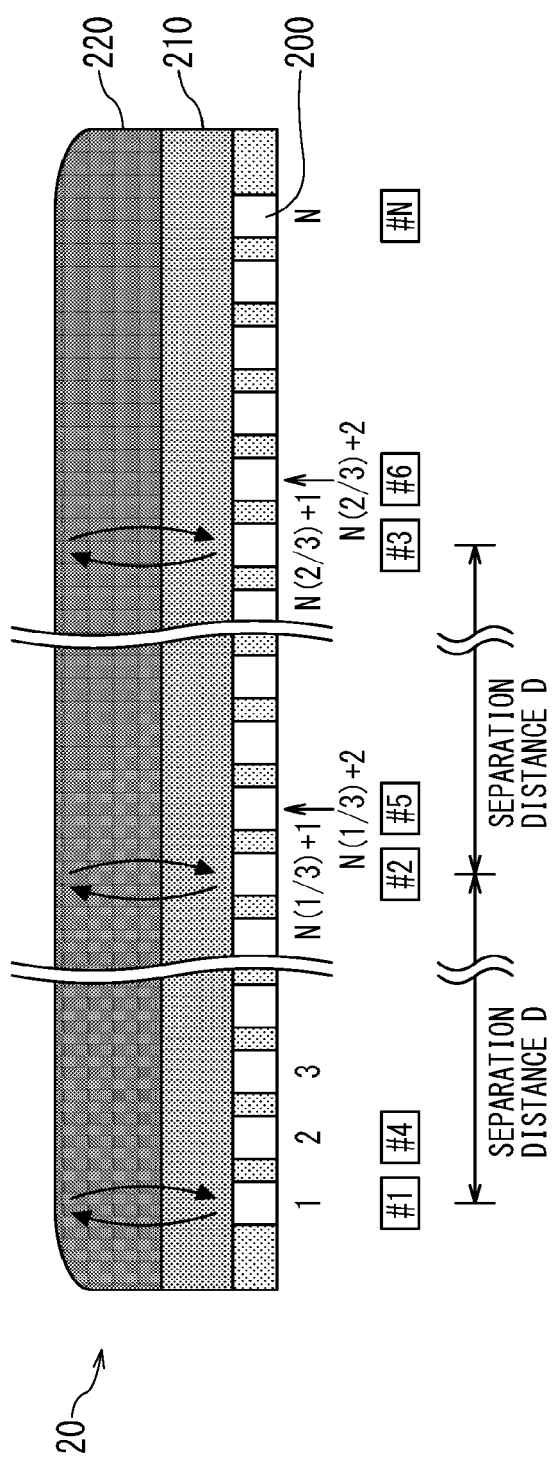

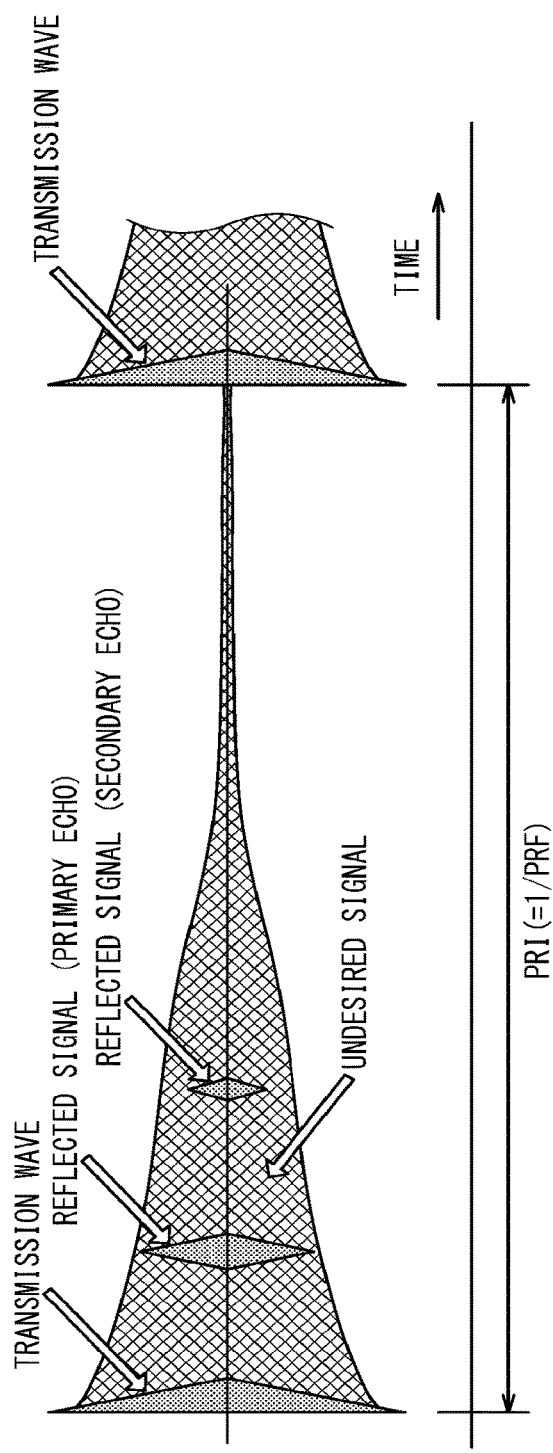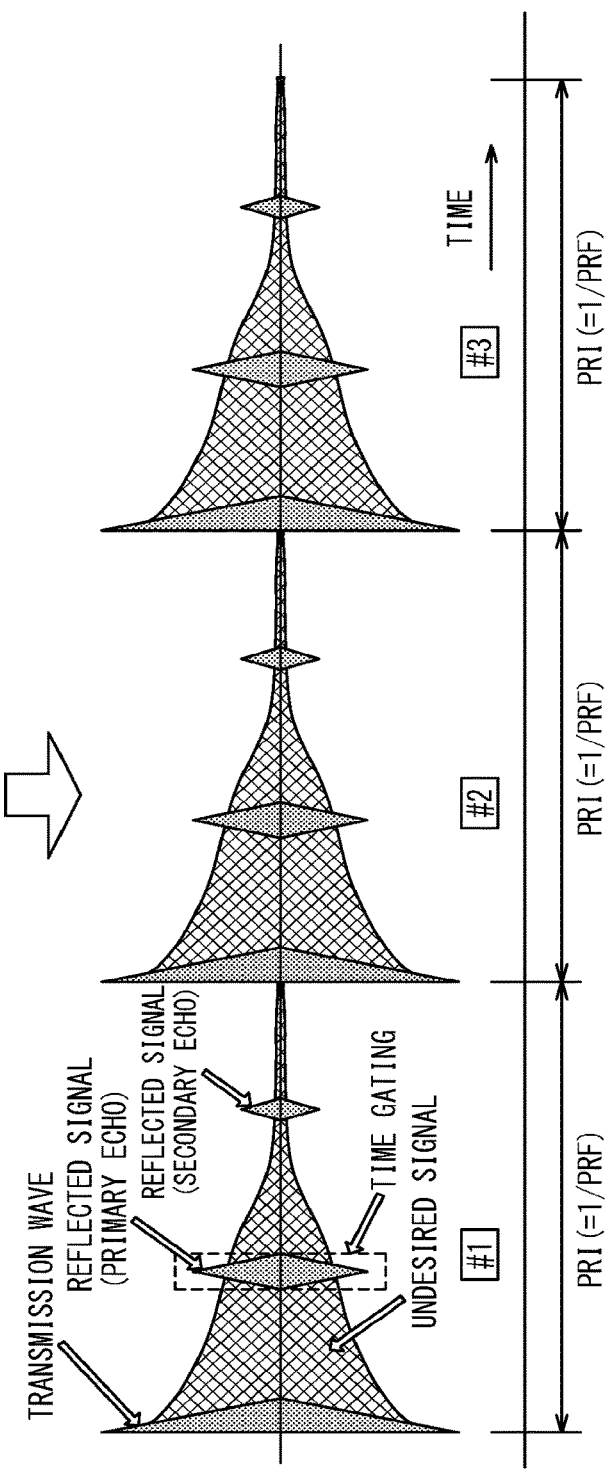

ULTRASONIC DIAGNOSTIC APPARATUS AND PROBE INSPECTION APPARATUS

CROSS-REFERENCE TO RELATED APPLICATION

This application claims the benefit of priority of Japanese Patent Application No. 2022-013075, filed on Jan. 31, 2022, the entire contents of which are incorporated herein by reference.

FIELD

Disclosed embodiments relate generally to an ultrasonic diagnostic apparatus and a probe inspection apparatus.

BACKGROUND

An ultrasonic diagnostic apparatus transmits an ultrasonic pulse and/or an ultrasonic continuous wave generated by transducers included in an ultrasonic probe into an object's body and converts the reflected ultrasonic wave, which is caused by difference in acoustic impedance between tissues inside the object, into an electric signal so as to non-invasively acquire information inside the object. A medical examination using such an ultrasonic diagnostic apparatus can readily generate and acquire medical images such as tomographic images and three-dimensional images inside the object by bringing the ultrasonic probe into contact with the body surface, and thus, is widely applied to morphological diagnosis and functional diagnosis of an organ.

Normal operation of the ultrasonic probe is essential to correct diagnosis, thereby inspections of the ultrasonic probe have been conventionally executed. Typical inspections of the ultrasound probe include a periodic inspection to be executed periodically, for example, every year or every two years. In recent years, there has been a movement to make periodic inspections of the ultrasonic probe obligatory by law.

In a known technique for inspecting the ultrasonic probes, a reflected signal from the interface between an ultrasonic lens and the air is used for determining the reception sensitivity of each ultrasonic transducer and/or presence/absence of disconnection in each ultrasonic transducer. This technique does not require an inspection tool such as a reflector plate provided through a medium like water, and thus has an advantage of easy inspection of the ultrasonic probe.

In this technique, however, there is a possibility of causing a phenomenon in which undesired signals caused by noise factors such as multiple reflections within the ultrasonic probe are superimposed on the reflected signal from the interface (i.e., inspection signal), resulting in difficulty in properly separating and extracting the reflected signal from the undesired signals.

BRIEF DESCRIPTION OF THE DRAWINGS

In the accompanying drawings:

FIG. 3A and FIG. 3B are schematic diagrams illustrating a conventional inspection method for the general ultrasonic probe and a problem of this conventional inspection method;

FIG. 7A and FIG. 7B are schematic diagrams illustrating a comparison in terms of selection order of ultrasonic transducers between the conventional probe inspection processing and the probe inspection processing of the first embodiment;

FIG. 9A and FIG. 9B are schematic diagrams illustrating the effects of the probe inspection method according to the first embodiment as compared with the conventional probe inspection method;

DETAILED DESCRIPTION

Hereinafter, embodiments of the present invention will be described by referring to the accompanying drawings.

In one embodiment, an ultrasonic diagnostic apparatus includes an ultrasonic probe and a main body. The ultrasonic probe includes at least a plurality of ultrasonic transducers arranged in an array and an ultrasonic lens. The main body inspects the ultrasonic probe by using a reflected signal from an interface between the ultrasonic lens and air, and includes inspection processing circuitry. The inspection processing circuitry is configured to: sequentially select an ultrasonic transducer to be inspected from the plurality of ultrasonic transducers one by one in such an manner that any two ultrasonic transducers being continuously selected are not spatially adjacent but are separated by a predetermined separation distance; cause the selected ultrasonic transducer to transmit an ultrasonic pulse; and sequentially inspect each of the plurality of ultrasonic transducers by acquiring a reflected signal responding to transmission of the ultrasonic pulse from the interface.

First Embodiment

Figure 1:
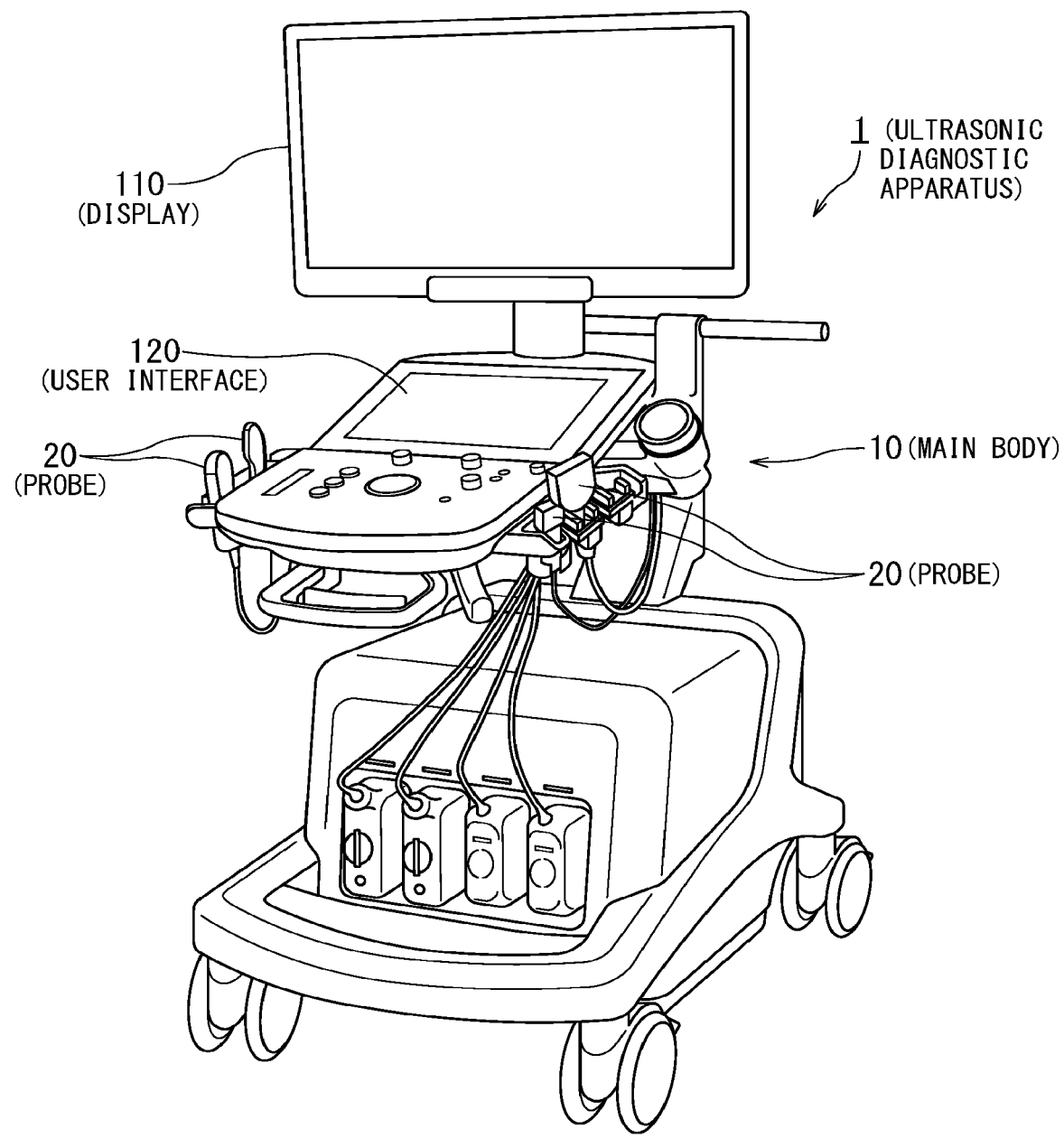
FIG. 1 is an oblique view illustrating an appearance of an ultrasonic diagnostic apparatus according to the first embodiment.

FIG. 1 is an oblique view illustrating an appearance of an ultrasonic diagnostic apparatus 1 according to the first embodiment. As shown in FIG. 1, the ultrasonic diagnostic apparatus 1 includes a main body 10 and an ultrasonic probe 20 (hereinafter shortly referred to as the probe 20).

The main body 10 includes a display 110 and a user interface 120 in addition to various circuits (FIG. 5) housed in a main-body housing with casters.

The display 110 displays various data and ultrasonic images generated by various circuits in the main body 10. The display 110 includes, for example, a liquid crystal display panel and/or an organic EL (Electro Luminescence) panel.

The user interface 120 allows a user to input various data and information to the main body 10, or set various operation modes to the main body 10. The user interface 120 may be configured to include an operation panel 121 and a touch panel 122 (FIG. 5), for example.

The operation panel 121 is provided with a trackball, various switches, and dials. The user can input various data and information to the main body 10 using these operation devices of the operation panel 121.

The touch panel 122 is a display-and-input device configured by overlaying a touch screen on a display panel such as a liquid crystal panel. Various data and information can be inputted to the main body 10 by touching or pressing the touch screen in accordance with contents shown on the display panel. For example, when plural icons respectively corresponding to plural probes 20, which are connected to the main body 10, are displayed on the display panel, a desired probe 20 can be selected by touching its corresponding icon on the touch screen.

As described below, the ultrasonic diagnostic apparatus 1 of the present embodiment can inspect the probe 20. The touch panel 122 is configured to receive user operations for executing the probe inspection and to display the probe inspection result, for example. The result of the probe inspection may be displayed on the display 110.

Figure 2:
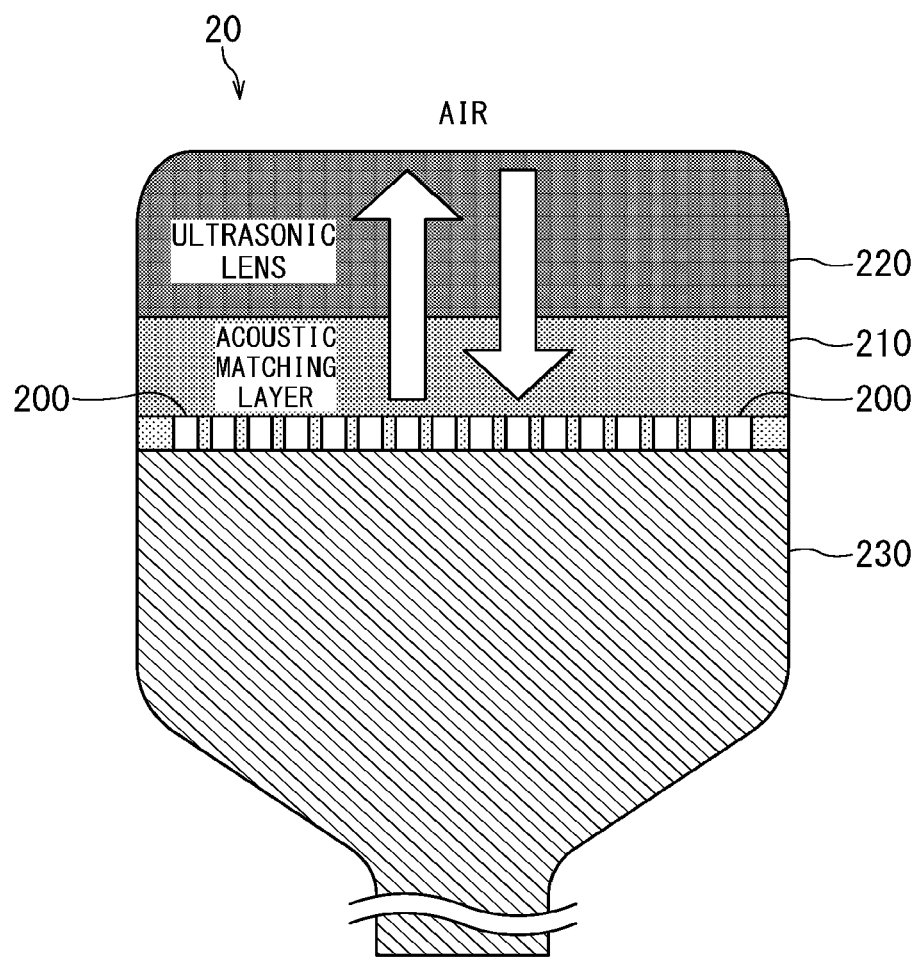
FIG. 2 is a schematic diagram illustrating a configuration of a general ultrasonic probe to be inspected and a concept of an inspection method to be executed by the ultrasonic diagnostic apparatus.

FIG. 2 is a schematic diagram illustrating a configuration of the general probe 20 to be inspected and the concept of the inspection method performed by the ultrasonic diagnostic apparatus 1.

The probe 20 includes: an ultrasonic lens 220; an acoustic matching layer 210; a plurality of ultrasonic transducers 200 arranged in an array; and a base 230 in the order from its tip (i.e., portion to be brought into contact with the object or its body surface). The interior of the base 230 is provided with components such as: a backing material disposed in contact with the array of the ultrasonic transducers 200; and an electronic circuit configured to exchange signals between the ultrasonic transducers 200 and a transmission/reception circuit 310 (FIG. 5) of the main body 10.

In the ultrasonic diagnostic apparatus 1 of the present embodiment, when inspecting the probe 20, the transmission pulse is transmitted while the ultrasonic lens 220 is exposed to the air around the ultrasonic diagnostic apparatus 1, and the probe 20 is inspected by using the reflected signal from an interface between the ultrasonic lens 220 and the air as shown in FIG. 2. It is known that the transmission pulse is almost totally reflected at the interface between the ultrasonic lens 220 and the air.

The probe 20 to be inspected may be a one-dimensional probe (1D probe) in which the ultrasonic transducers 200 are arranged in a row array, or may be a two-dimensional probe (2D probe) in which the ultrasonic transducers 200 are arranged in a planar array.

FIG. 3A to FIG. 4B are schematic diagrams illustrating conventional probe inspection methods and their problems. The probe inspection methods shown in FIG. 3A to FIG. 4B also use the reflected signal from the interface between the ultrasonic lens 220 and the air.

FIG. 3A is a schematic structural diagram illustrating the tip of the probe 20, i.e., the portion from the arrangement layer of the ultrasonic transducers 200 to the ultrasonic lens 220. Although the probe 20 to be inspected by the ultrasonic diagnostic apparatus 1 of each embodiment may be either a 1D probe or a 2D probe, and is not limited by the array dimension of the ultrasonic transducers 200, it is assumed in the following description that the probe 20 is a 1D probe and the number of the ultrasonic transducers 200 is N for facilitating the understanding.

In FIG. 3A, the numbers "1", "2", "3", and "N" shown below the array layer of the ultrasonic transducers 200 indicate the spatial arrangement order of the ultrasonic transducers 200. For the case of FIG. 3A, a total of N ultrasonic transducers 200 are sequentially numbered by natural numbers in order from left to right.

Execution of inspecting the probe 20 is roughly described as follows. That is: each of the ultrasonic transducers 200 is selected one by one; the selected ultrasonic transducer 200 is made to transmit an ultrasonic pulse; the reflected signal of the ultrasonic pulse responding to this transmission, i.e., the reflected signal from the interface between the ultrasonic lens 220 and the air is received by the selected ultrasonic transducer 200; whether the selected ultrasonic transducer 200 is deteriorated is determined on the basis of the amplitude information of the received reflected signal; and the above-described processing is repeated for the number of the ultrasonic transducers 200 to determine if there is deterioration or degree of deterioration for each ultrasonic transducer 200, for example.

In FIG. 3A, the numbers "#1", "#2", "#3", and "#N" shown right below the numbers "1", "2", "3", and "N" indicate the temporal selection order of the ultrasonic transducers 200. In the conventional probe inspection, the ultrasonic transducers 200 to be inspected are selected in such a manner that one-to-one correspondence is established between the spatial arrangement order and the temporal selection order for each ultrasonic transducer 200. In other words, the ultrasonic transducer 200 to be inspected is sequentially selected one by one in such a manner that any two ultrasonic transducers 200 being continuously selected are spatially adjacent to each other.

FIG. 3B is a schematic waveform diagram illustrating signals received by each of the ultrasonic transducers 200 in response to transmission of an ultrasonic pulse during inspection. The transmission wave shown on the left end of FIG. 3B corresponds to the ultrasonic pulse at the transmission timing.

The transmission wave emitted from the ultrasonic transducer 200 is totally reflected at the interface between the ultrasonic lens 220 and the air, and then is received by the ultrasonic transducer 200 as the reflected signal. This reflected signal is reflected only once at the interface and thus is referred to as the primary echo. The time (t) from transmitting the transmission wave to receiving the primary echo is determined by: the distance (r) of the shortest path between the ultrasonic transducer 200 and the interface; and the propagation velocity (v) of the ultrasonic wave in the ultrasonic lens 220 and the acoustic matching layer 210 (t=2r/v).

Although most of the primary echo is received by the ultrasonic transducer 200, part of the primary echo is reflected and returned to the ultrasonic lens 220 from the ultrasonic transducer 200. Such returned echo is totally reflected again at the interface and received by the ultrasonic transducer 200 as a further reflected signal. This further reflected signal is called a secondary echo because the transmission wave is reflected twice at the interface. The time length from transmitting the transmission wave to receiving secondary echo is twice the time length from transmitting transmission wave to receiving the primary echo.

In this manner, the transmission wave is reflected two or more times between the ultrasonic transducer 200 and the interface, so that reflected signals of multi-order echoes such as the secondary echo and the tertiary echo are received. However, the multi-order echo is attenuated due to the long propagation path, and in particular, the amplitude of the tertiary echo and thereafter is considerably small.

On the other hand, immediately after transmitting the transmission wave, undesired signals that exhibit continuous or irregular fluctuation are received. These undesired signals are considered to be generated by the transmission wave being reflected by various structures inside the probe 20, and a large number of reflected signals from these various structures are superimposed on each other.

Normally, the amplitude of the undesired signal is the largest immediately after transmission, and decreases as time elapses. When the time interval between ultrasonic pulses, i.e., the pulse repetition interval (PRI) is short, various undesired signals generated by the transmission of a plurality of continuous ultrasonic pulses are superimposed on each other, and consequently, the amplitude of the entire undesired signals increases.

In order to avoid the above-described situation, in the conventional probe inspection methods, a pulse repetition period is set to be so long as to temporally separate an undesired signal caused by one transmission wave from another undesired signal caused by the next transmission wave. That is, a pulse repetition period is set to be so long as to temporally separate two continuous undesired signals, so as to reduce the undesired signals.

The reciprocal of the pulse repetition interval (PRI) is the pulse repetition frequency (PRF), and thus, setting the pulse repetition interval (PRI) longer is equivalent to setting the pulse repetition frequency (PRF) lower.

Figure 4A:
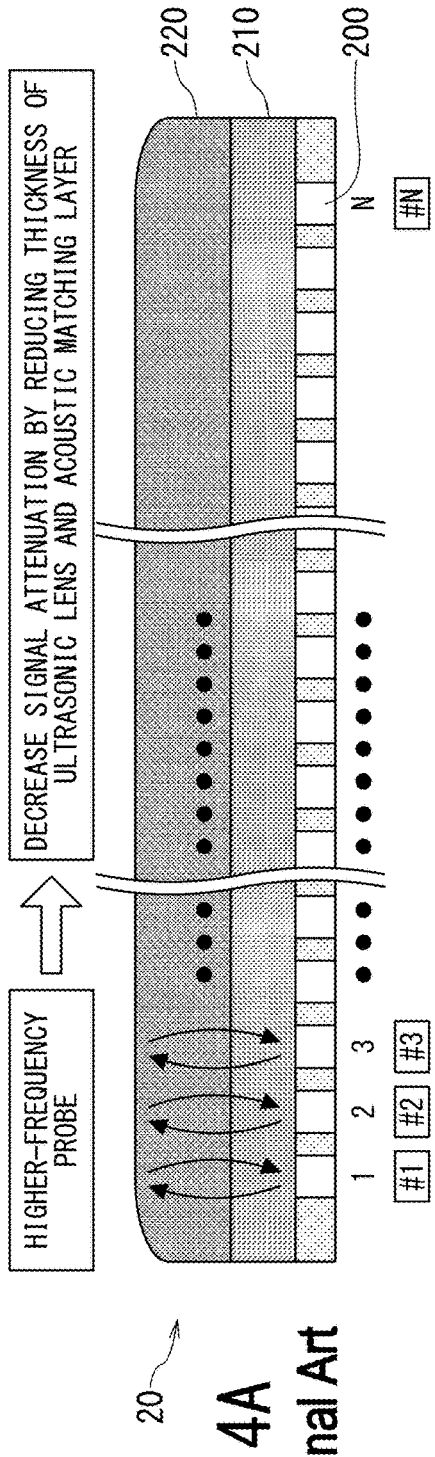
FIG. 4A and FIG. 4B are schematic diagrams illustrating a conventional inspection method for a high-frequency ultrasonic probe and a problem of this conventional inspection method.

In recent years, there is a tendency to increase the frequency of ultrasonic signals from the viewpoint of improving resolution. FIG. 4A is a schematic structural diagram illustrating the tip portion of the higher-frequency probe 20. As the frequency of the ultrasonic signal increases, the propagation loss per unit length of the acoustic matching layer 210 and/or the ultrasonic lens 220 increases. Accordingly, as can be seen in comparison with FIG. 3A, in the higher-frequency probe 20, by reducing the thickness of the acoustic matching layer 210 and/or the ultrasonic lens 220 in the propagation direction, an increase in propagation loss is suppressed.

Note that in the conventional probe inspection methods, even in the case of using this higher-frequency probe 20, each of the ultrasonic transducers 200 is selected in a manner that the spatial arrangement order and the temporal selection order of the ultrasonic transducers 200 correspond one-to-one.

Figure 4B:
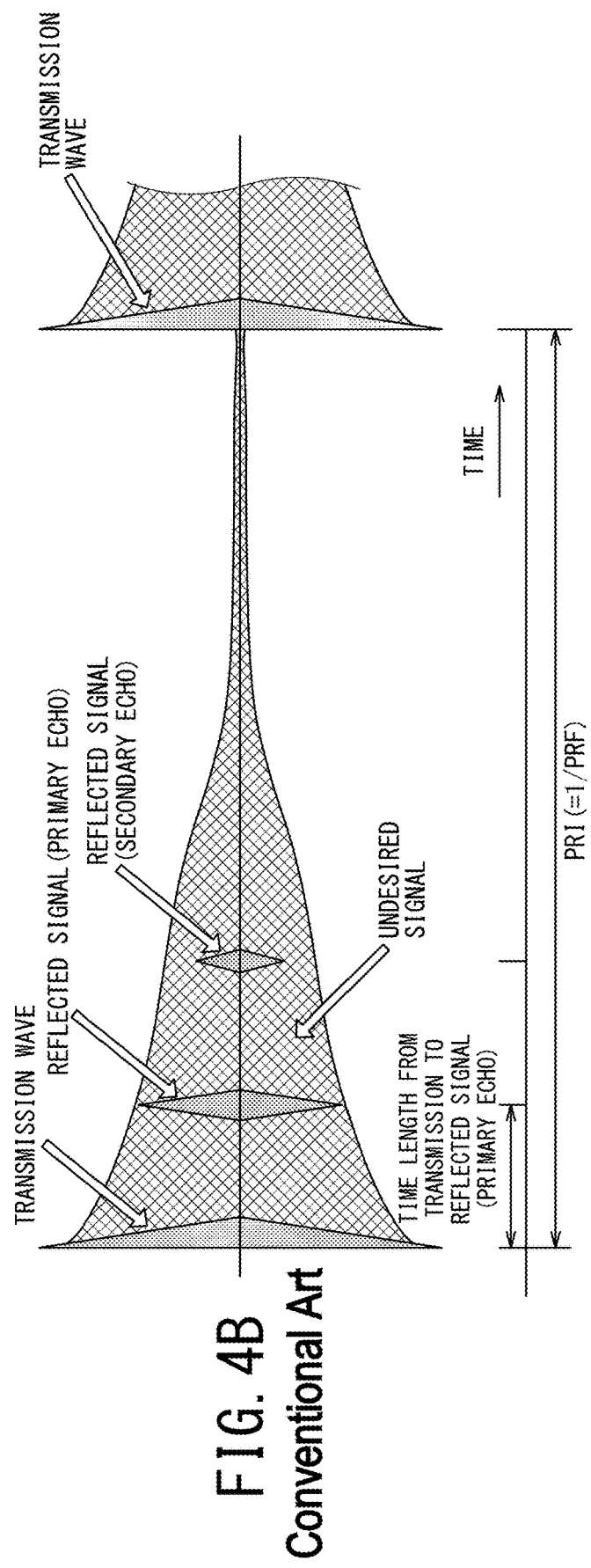

FIG. 4B is a schematic waveform diagram illustrating signals received by each of the ultrasonic transducers 200 during inspection of the higher-frequency probe 20. Since the acoustic matching layer 210 and the ultrasonic lens 220 are thinner in the propagation direction, the time length from the transmission of the ultrasonic pulse to reception of the primary echo and/or the secondary echo is also shortened.

Accordingly, in the higher-frequency probe 20, the primary echo and secondary echo enter the region close to the transmission wave (i.e., the region where the undesired signals are large). Therefore, it becomes difficult to extract the primary echo and the secondary echo from the reception signal on which the undesired signals with large amplitude are superimposed, and a reliable probe inspection cannot be executed. The ultrasonic diagnostic apparatus 1 according to the present embodiment is meant to solve such problems.

Figure 5:
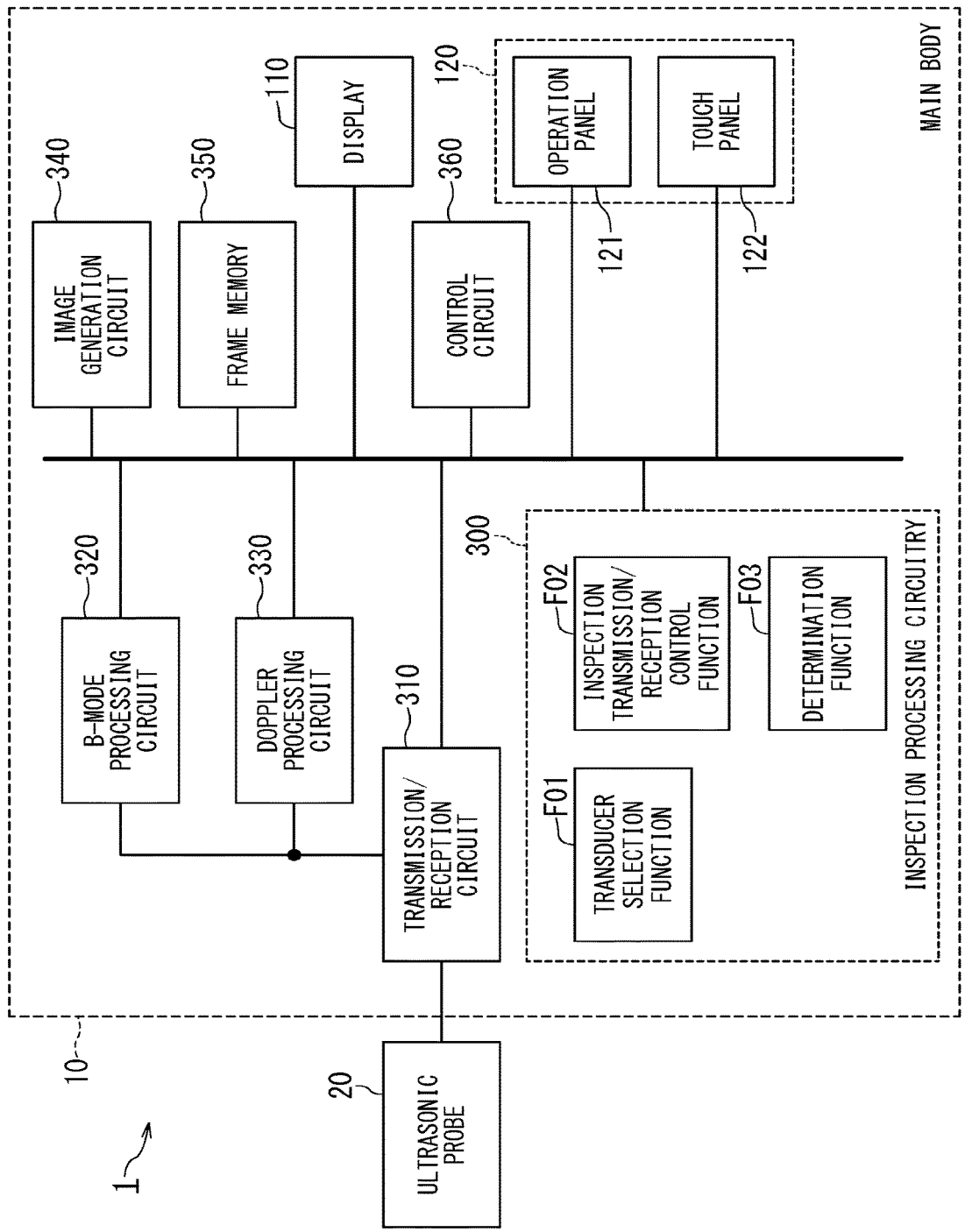
FIG. 5 is a block diagram illustrating a configuration of the ultrasonic diagnostic apparatus according to the first embodiment.

FIG. 5 is a block diagram illustrating a configuration of the ultrasonic diagnostic apparatus 1 according to the first embodiment. The ultrasonic diagnostic apparatus 1 includes the main body 10 and at least one probe 20 connected to the main body 10.

The main body 10 includes: a transmission/reception circuit 310; a B-mode processing circuit 320; a Doppler processing circuit 330; an image generation circuit 340; a frame memory 350; a control circuit 360; and inspection processing circuitry 300, in addition to the display 110 and the user interface 120 provided with the operation panel 121 and the touch panel 122 described above.

During transmission, the transmission/reception circuit 310 supplies a pulse signal for generating an ultrasonic pulse to each of plural ultrasonic transducers 200 provided in the probe 20. During reception, the transmission/reception circuit 310 converts the reception signals outputted from the respective ultrasonic transducers 200 of the probe 20 into digital signals, and further performs weighted summation of these digitized reception signals so as to form a reception beam. The transmission/reception circuit 310 scans the direction of the reception beam based on the control signals from the control circuit 360, for example.

The B-mode processing circuit 320 executes signal processing such as logarithmic detection processing on the beamformed reception signal, and generates a B-mode image by using information on the scanning direction.

The Doppler processing circuit 330 executes signal processing such as correlation processing and/or Fourier transform on the beamformed reception signal, and generates a color Doppler mode image and/or a pulse Doppler mode signal on the basis of information on the scanning direction.

The image generation circuit 340 converts a B-mode image and/or a color Doppler mode image into a display image to be displayed on the display 110, and also executes processing for adding various auxiliary information to the display image. The frame memory 350 is a recording medium for sequentially recording the above-described display images generated at a predetermined frame rate as frame images.

The control circuit 360 controls the entire ultrasonic diagnostic apparatus 1, and also controls display of the inspection results of the probe 20 on the display 110 and/or the touch panel 122.

The inspection processing circuitry 300 executes processing related to inspection of the probe 20. In the ultrasonic diagnostic apparatus 1 according to the first embodiment, the inspection processing circuitry 300 inspects the probe 20 by implementing each of a transducer selection function F01, an inspection transmission/reception control function F02, and a determination function F03.

The inspection processing circuitry 300 is a circuit provided with a central processing unit (CPU) and/or a special-purpose or general-purpose processor, for example. The processor implements each of the transducer selection function F01, the inspection transmission/reception control function F02, and the determination function F03 by executing various programs stored in a memory (not shown). The inspection processing circuitry 300 may be configured of hardware such as a field programmable gate array (FPGA) and an application specific integrated circuit (ASIC). The various functions described above can also be implemented by such hardware. Additionally, the inspection processing circuitry 300 can implement the various functions by combining hardware processing and software processing based on its processor and programs.

Figure 6:
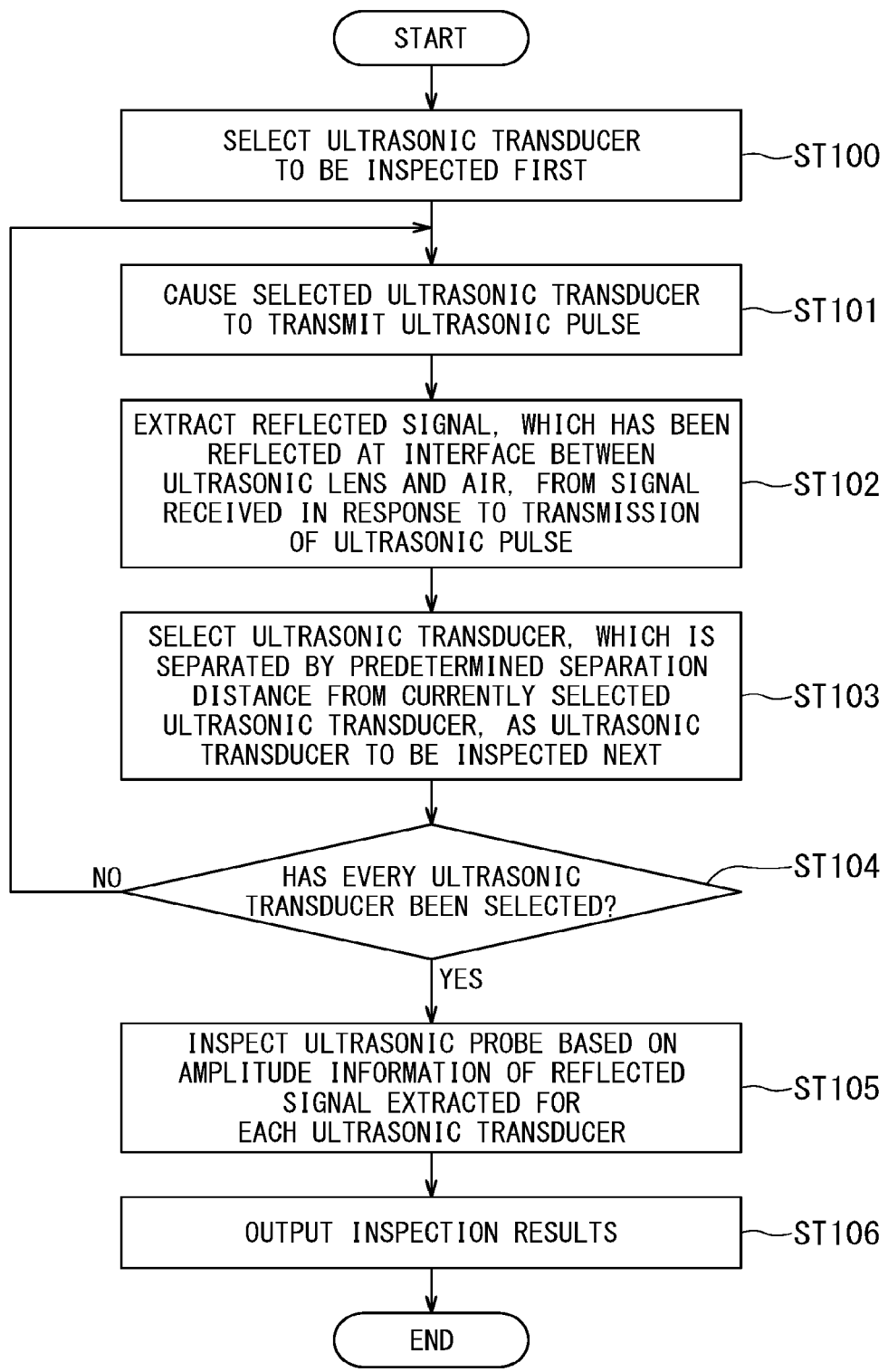
FIG. 6 is a flowchart illustrating probe inspection processing to be executed by the ultrasonic diagnostic apparatus 1 according to the first embodiment.

FIG. 6 is a flowchart illustrating the probe inspection processing executed by the ultrasonic diagnostic apparatus 1 according to the first embodiment. Hereinafter, a description will be given of the probe inspection processing according to the first embodiment based on this flowchart by referring to related diagrams of FIG. 7A to FIG. 9B as required.

First, in the step ST100 of FIG. 6, an ultrasonic transducer 200 to be inspected first is selected.

In the next step ST101, the selected ultrasonic transducer 200 transmits an ultrasonic pulse.

In the next step ST102, from the signal received in response to the transmission of the ultrasonic pulse, a reflected signal from the interface between the ultrasonic lens 220 and the air, for example, the primary echo of the ultrasonic pulse, is extracted, and then the amplitude information of the extracted reflected signal is stored in an appropriate memory.

In the next step ST103, an ultrasonic transducer 200 that is separated by a predetermined separation distance D from the currently selected ultrasonic transducer 200 is selected as the next ultrasonic transducer 200 to be inspected.

In the next step ST104, it is determined whether every ultrasonic transducer 200 has been selected or not. The processing from the steps ST101 to ST103 is repeated until every ultrasonic transducer 200 is selected. If all the ultrasonic transducers 200 have been selected, i.e. if it is determined that transmission/reception from and by every ultrasonic transducer 200 has been completed, the processing proceeds to the step ST105.

In the next step ST105, comprehensive inspection of the probe 20 is executed based on the amplitude information of the reflected signal extracted for each ultrasonic transducer 200. For example, if the ratio of the number of ultrasonic transducers 200, which amplitude value of the reflected signal is smaller than a predetermined reference value, to the total number of ultrasonic transducers 200 exceeds a predetermined ratio, the inspected probe 20 is determined to be defective or unusable.

In the next step ST106, the inspection results are outputted. For example, quality determination results, such as whether the inspected probe 20 is unusable and/or an index indicative of deterioration degree, are outputted as the inspection results and displayed on the touch panel 122 and/or the display 110 of the main body 10.

For example, the processing of the steps ST100, ST103, and ST104 is executed by the transducer selection function F01 of the inspection processing circuitry 300, the processing of steps ST101 and ST102 is executed by the inspection transmission/reception control function F02 of the inspection processing circuitry 300, and the processing of steps ST105 and ST106 is executed by the determination function F03 of the inspection processing circuitry 300.

The main difference between the conventional probe inspection processing and the probe inspection processing according to the first embodiment lies in the processing of the step ST103.

FIG. 7A is the same diagram as FIG. 4A, and the temporal selection order of the ultrasonic transducers 200 in the conventional probe inspection processing is shown by numbers such as as "#1" and "#2". As described above, in the conventional probe inspection process, the ultrasonic transducer 200 to be inspected is sequentially selected one by one temporally in accordance with the spatial arrangement order.

On the other hand, as shown in FIG. 7B, in the probe inspection processing according to the first embodiment, the spatial arrangement order of the ultrasonic transducers 200 does not match the temporal selection order of the ultrasonic transducers 200.

In the probe inspection processing according to the first embodiment, the ultrasonic transducer 200 to be inspected is sequentially selected one by one in such a manner that any two ultrasonic transducers 200 being continuously selected are not spatially adjacent to each other but are separated by the predetermined separation distance D. In other words, any two ultrasonic transducers 200 that are spatially separated by the separation distance D are selected to be continuously inspected.

The predetermined separation distance D is required to be determined in consideration of conditions such as the repetition frequency (PRF) of the ultrasonic pulse. However, in view of the spatial attenuation of the undesired signals, the separation distance D is desirably to be as long as possible. In the case of FIG. 7B, for example, when the distance between adjacent ultrasonic transducers 200 is defined as d and the total number of ultrasonic transducers 200 is defined as N, the separation distance D may be determined to be about one-third of the one-dimensional array length (=d*N), i.e., D=d*(N/3).

Figure 8A:
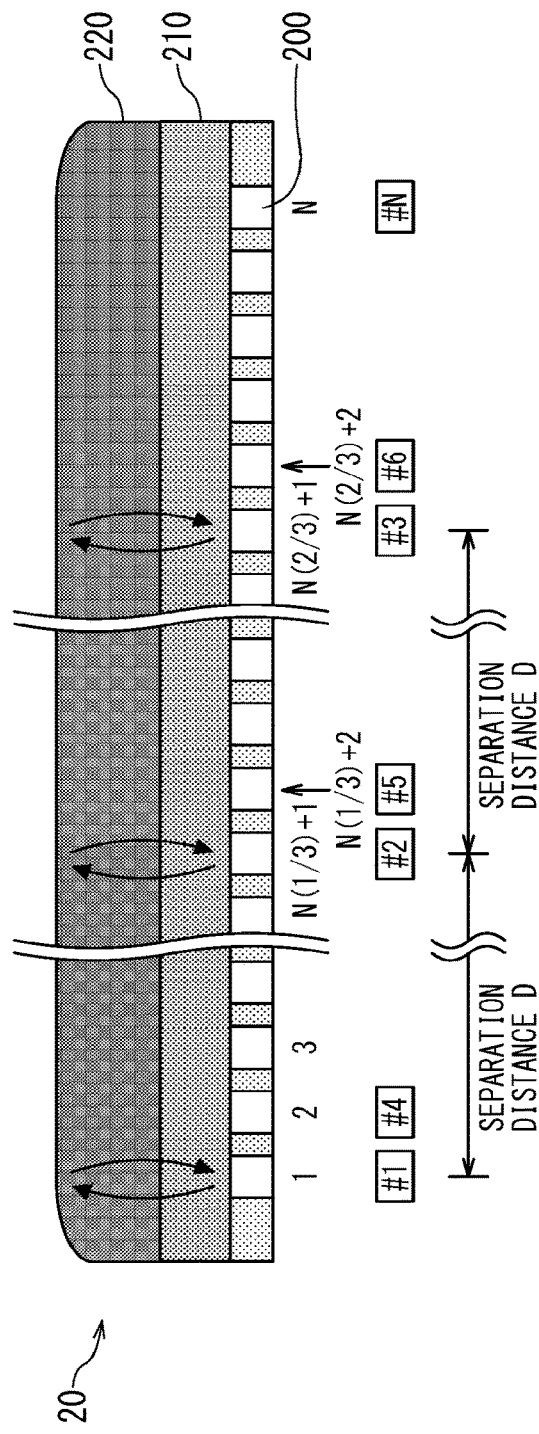
FIG. 8A and FIG. 8B are schematic diagrams illustrating the selection order of the ultrasonic transducers and the corresponding reception signals of the ultrasonic transducers in the first embodiment.
Figure 8B:
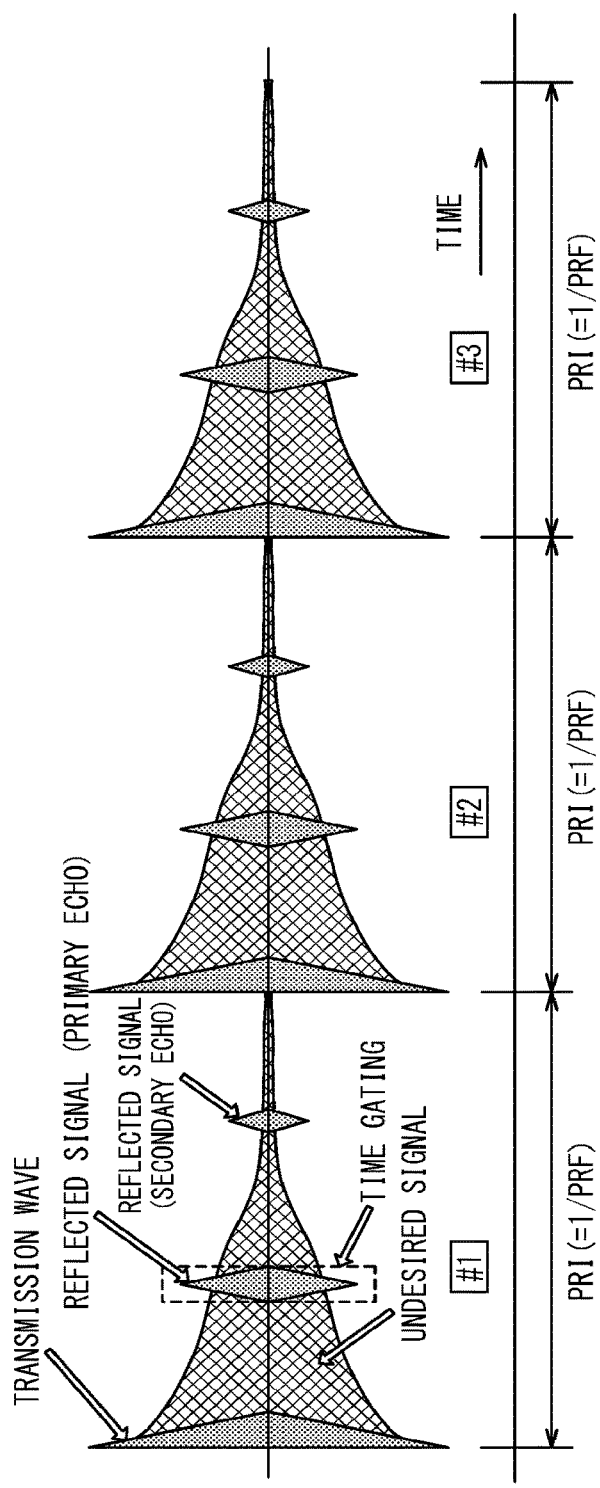

FIG. 8A is the same diagram as FIG. 7B and illustrates the selection order of the ultrasonic transducers 200 in the probe inspection processing according to the first embodiment. FIG. 8B is a schematic waveform diagram illustrating reception signals of the respective ultrasonic transducers 200 in the time axis direction when the ultrasonic transducers 200 are selected in the order shown in FIG. 8A.

When any two ultrasonic transducers 200 continuous in the selection order are spatially separated in transmission processing, it enables not only temporal attenuation but also spatial attenuation of the undesired signals that are superimposed over a plurality of pulse repetition intervals (PRI). As a result, as shown in FIG. 8B, the amplitude ratio of the reflected signal such as the primary echo and the secondary echo to the undesired signals can be increased.

Further, as shown in FIG. 8B, the reflected signal (for example, the primary echo) may be extracted by time gating. When the reflected signal is extracted by time gating, the undesired signals before and after the gate time can be removed, and thus, amplitude information of the reflected signal can be obtained with high reliability.

Since the thickness of the ultrasonic lens 220 and the thickness of the acoustic matching layer 210 are known, the distance from the selected ultrasonic transducer 200 to the interface between the ultrasonic lens 220 and the air is also known. Further, the velocity at which the ultrasonic signal propagates through the ultrasonic lens 220 and the acoustic matching layer 210 is also known. Hence, based on these distances and velocity, a delay time from transmitting the transmission wave to receiving the reflected signal (for example, primary echo) can be calculated, and the gate time can be set based on the calculated delay time.

FIG. 9A and FIG. 9B are schematic diagrams illustrating the effects of the probe inspection method according to the first embodiment as compared with the conventional method.

FIG. 9A is a schematic timing diagram illustrating the reception signal of each ultrasonic transducer 200 when using the conventional probe inspection method. As described above, in the case of inspecting a higher-frequency probe using the conventional probe inspection method, because the reflected signal may be near the transmission wave, it is more likely that the reflected signal is buried in undesired signals and becomes difficult to be detected, as described above.

In order to prevent the undesired signals from being superimposed over a plurality of pulse repetition intervals (PRI), it is necessary to sufficiently attenuate the undesired signals within one repetition period (PRI). However, in the conventional probe inspection method, the only means for attenuating the undesired signals is temporal attenuation, and thus, the pulse repetition interval (PRI) of the ultrasonic pulse needs to be set long. In other words, the pulse repetition frequency (PRF) of the ultrasonic pulse needs to be set low, and consequently, the inspection time of the probe 20 is lengthened.

In the probe inspection method according to the first embodiment, the ultrasonic transducer 200 to be inspected is sequentially selected one by one in such a manner that any two ultrasonic transducers 200 being continuously selected are not spatially adjacent to each other but are separated by the predetermined separation distance D. Thus, the undesired signals are attenuated not only temporally but also spatially over the separation distance D.

Accordingly, the attenuation amount of the undesired signals is larger than that of the conventional probe inspection methods. Hence, even if the time length between the transmission wave and the reflected signal (primary echo and/or secondary echo) is short, it becomes easier to extract the reflected signal such as the primary echo and the secondary echo from the reception signal on which the undesired signals are superimposed.

Since both temporal attenuation and spatial attenuation can be expected, the undesired signals can be sufficiently attenuated within one pulse repetition interval (PRI). Hence, even if the pulse repetition interval (PRI) is set short, the undesired signals do not overlap over a plurality of pulse repetition intervals (PRI). Thus, in the probe inspection method according to the first embodiment, the pulse repetition interval (PRI) can be set shorter (i.e., the repetition frequency (PRF) can be set higher), and consequently, the inspection time of the probe 20 can be shortened.

As can be seen from the above description, the pulse repetition frequency (PRF) or pulse repetition interval (PRI) of the ultrasonic pulse and the spatial attenuation amount obtained by the separation distance D are related to each other.

Accordingly, for example, the inspection transmission/reception control function F02 of the inspection processing circuitry 300 may set the separation distance D depending on the pulse repetition frequency (PRF) of the ultrasonic pulse.

Specifically, the higher the pulse repetition frequency (PRF) is (i.e., the shorter the pulse repetition interval (PRI) is), the longer the separation distance D to be set by the inspection transmission/reception control function F02 becomes.

In addition, the inspection transmission/reception control function F02 determines the optimum pulse repetition frequency (PRF), based on at least one of: the thickness of the ultrasonic lens 220; the material of the ultrasonic lens 220; the thickness of the acoustic matching layer 210; the material of the acoustic matching layer 210; the transmission frequency; and the transmission voltage.

Modification of First Embodiment

Figure 10:
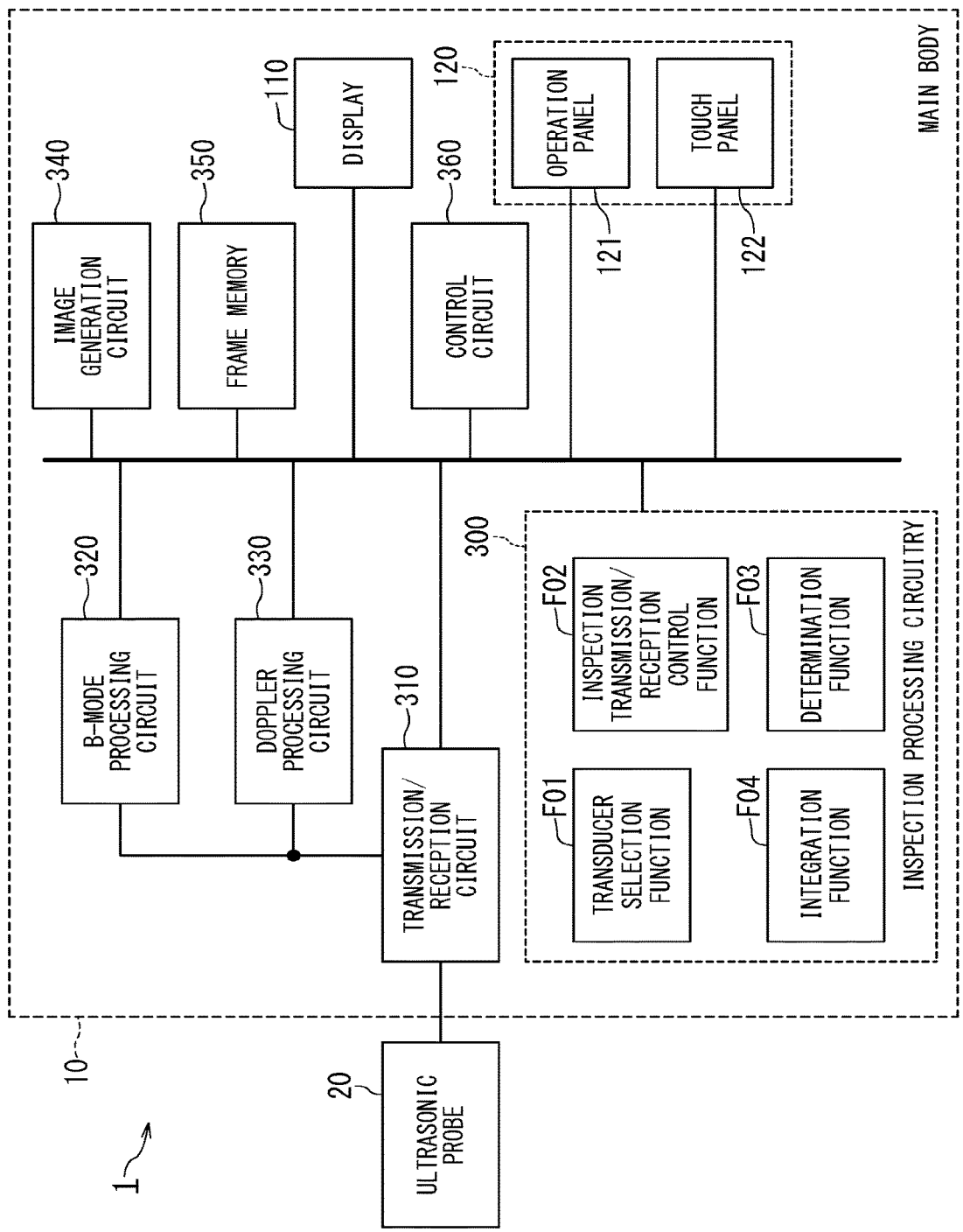
FIG. 10 is a block diagram illustrating a configuration of the ultrasonic diagnostic apparatus according to a modification of the first embodiment.

FIG. 10 is a block diagram illustrating a configuration of the ultrasonic diagnostic apparatus 1 according to a modification of the first embodiment. The difference between the first embodiment (FIG. 5) and its modification lies in that the inspection processing circuitry 300 of the modification of the first embodiment further has an integration function F04, while the rest of the configuration is the same as the first embodiment.

Figure 11:
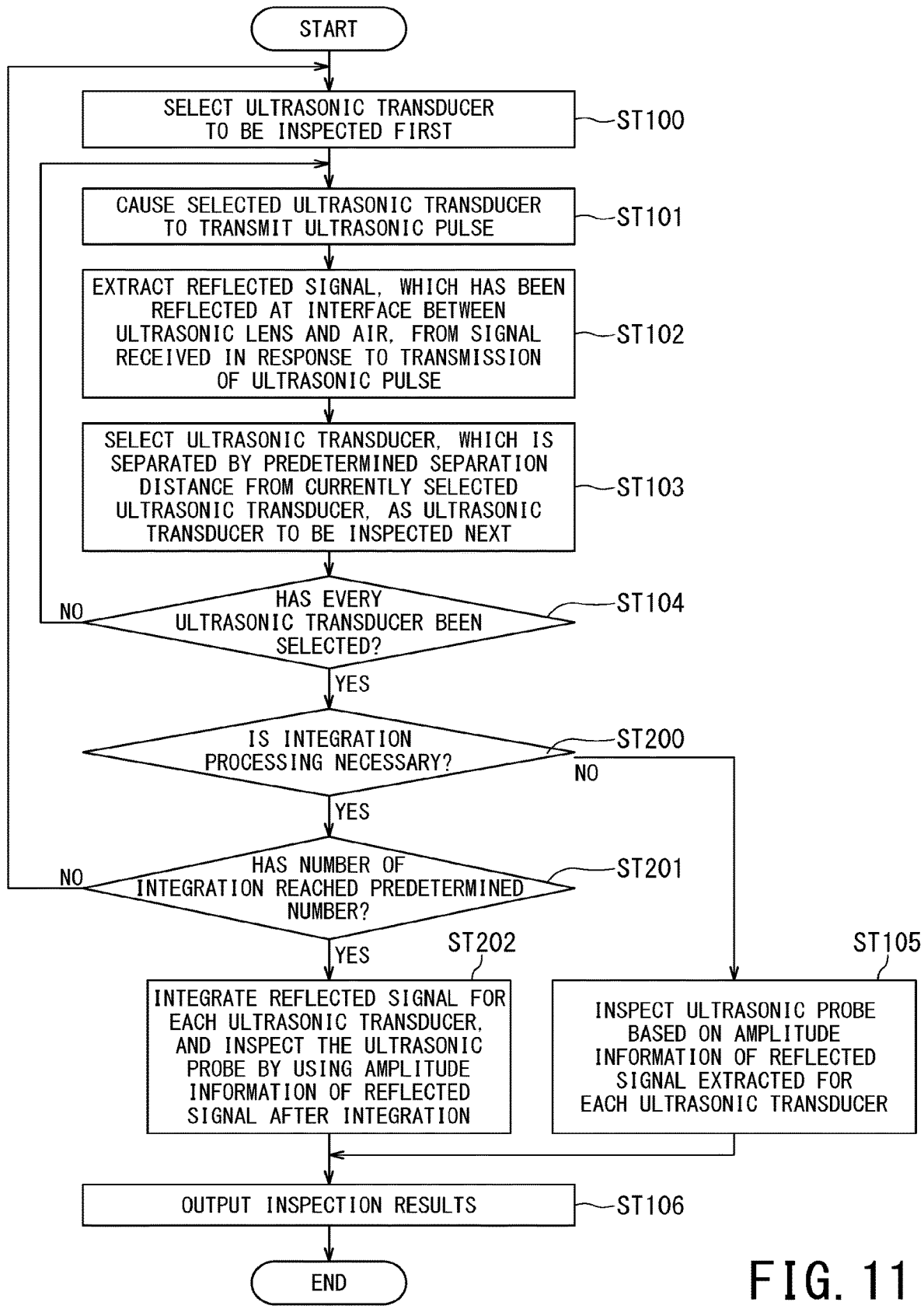
FIG. 11 is a flowchart illustrating probe inspection processing to be executed by the ultrasonic diagnostic apparatus according to the modification of the first embodiment.

FIG. 11 is a flowchart illustrating the probe inspection processing executed by the ultrasonic diagnostic apparatus 1 according to the modification of the first embodiment. The difference between the first embodiment (FIG. 6) and its modification lies in that the processing of the steps ST200, ST201, and ST202 are added in the modification, while the rest of the processing is the same as the first embodiment.

In the step ST200, it is determined if integration processing is necessary or not. If the integration processing is not necessary, the processing proceeds to the step ST105 and the same processing as the step ST105 in the first embodiment is executed. On the other hand, if it is determined the integration processing is necessary, the processing proceeds to the step ST201 to determine whether the number of the integration has reached a predetermined number. If not, the processing returns to step ST100 and the processing from the steps ST100 to ST200 is repeated until the number of the integration reaches the predetermined number. If the processing from the steps ST100 to ST200 is repeated by the predetermined integration number, the processing proceeds to the step ST202 in which the integration processing is executed.

Note that the modification of the first embodiment can also be configured to always perform integration processing. In this case, the determination processing of the step ST200 and the processing of the step ST105 are unnecessary and omitted.

In the step ST202, for each ultrasonic transducer 200, the reflected signals are integrated, and the inspection processing of the probe 20 is executed by using the amplitude information of the integrated reflected signals.

Figure 12:
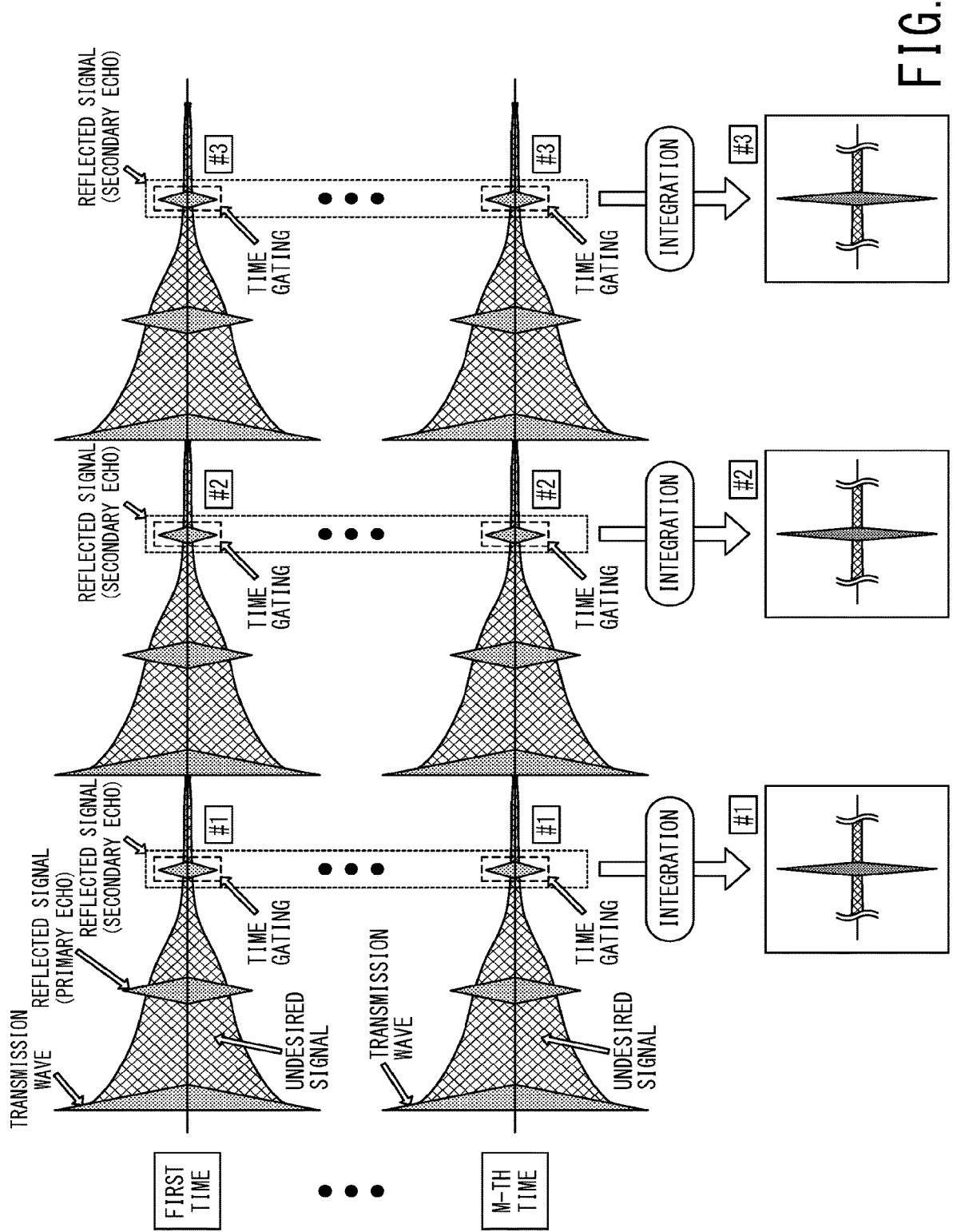
FIG. 12 is a schematic diagram illustrating a concept of integration processing in the modification of the first embodiment.

FIG. 12 is a schematic diagram illustrating the concept of the integration processing in the modification of the first embodiment. The top part of FIG. 12 illustrates how the reflected signals are acquired in the first time. Note that the top part of FIG. 12 is the same as the diagrams (FIG. 8B and FIG. 9B) showing how the reception signals are acquired by each ultrasonic transducer 200 in the first embodiment. FIG. 8B and FIG. 9B show the case where the gate time is set for the primary echo, while FIG. 12 shows the case where the gate time is set for the secondary echo.

In the modification of the first embodiment, one cycle is defined as the processing of selecting every ultrasonic transducer 200 in the probe 20 one by one and acquiring the reflected signals, and such processing is repeated for a plurality of cycles (i.e., M cycles: M is an integer of 2 or more) from the first time to the M-th time.

The plurality of reflected signals received by each of the ultrasonic transducers 200 during the plurality of cycles are integrated, and each of the plurality of ultrasonic transducers 200 is inspected by using the amplitude information of the integrated reflected signal.

Although the reflected signal to be integrated may be the primary echo, it is effective to extract and integrate any of multi-order echoes such as the secondary echo or the tertiary echo (the secondary echo is illustrated in the case of FIG. 12). This is because multi-order echoes are temporally separated from the transmission wave, which has an advantage of being less susceptible to the undesired signals, but also a disadvantage of having a low signal-to-noise ratio (SNR) due to their small amplitude.

For this reason, in the modification of the first embodiment, the reflected signal to be integrated is set to a multi-order echo (for example, the secondary echo), such that the integrated reflected signal, which is less susceptible to the undesired signals while having an improved SN ratio, can be used as a signal to be inspected, which enables highly reliable probe inspection.

Second Embodiment

In the above-described first embodiment and the modification of the first embodiment, the ultrasonic diagnostic apparatus 1 inspects the probe 20 of its own, and the inspection result is displayed on, for example, the display 110 of the ultrasonic diagnostic apparatus 1.

Figure 13:
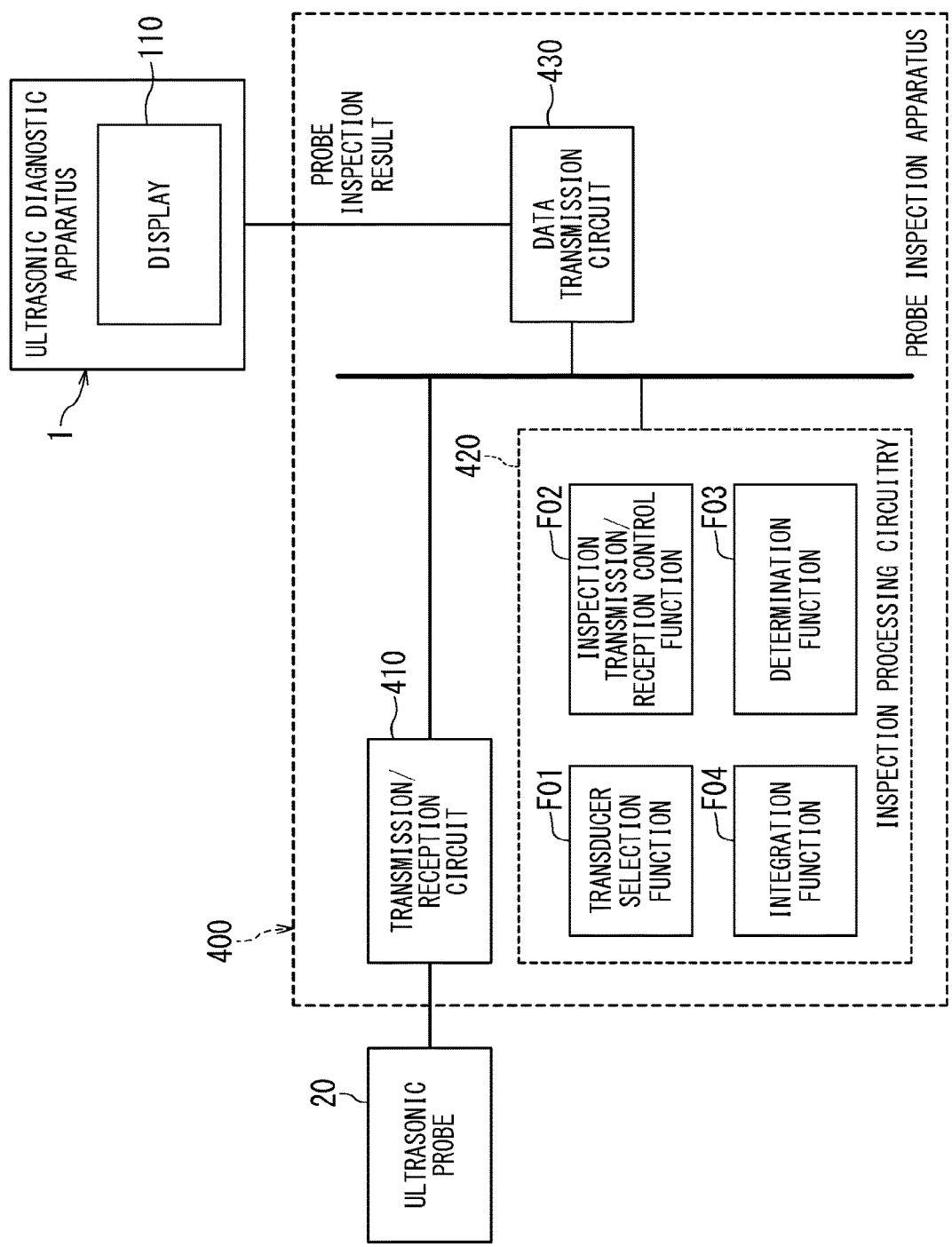
FIG. 13 is a block diagram illustrating a configuration of a probe inspection apparatus according to the second embodiment.

FIG. 13 is a block diagram illustrating an embodiment in which a probe inspection apparatus 400 according to the second embodiment for inspecting the probe 20 is provided as a separate configuration from the ultrasonic diagnostic apparatus 1.

The probe inspection apparatus 400 includes: a transmission/reception circuit 410; inspection processing circuitry 420; and a data transmission circuit 430. The transmission/reception circuit 410 may be the same as the transmission/reception circuit 310 (FIG. 5 or FIG. 10) provided in the ultrasonic diagnostic apparatus 1, or may be a simplified circuit that has only the functions necessary for the probe inspection.

The inspection processing circuitry 420 is the same as the inspection processing circuitry 300 provided in the ultrasonic diagnostic apparatus 1, and duplicate description is omitted.

The data transmission circuit 430 is a configuration for transmitting the inspection results of the probe 20 to the ultrasonic diagnostic apparatus 1. The ultrasonic diagnostic apparatus 1 displays the probe inspection results transmitted from the probe inspection apparatus 400 on a display device such as the display 110.

According to the ultrasonic diagnostic apparatus 1 and the probe inspection apparatus of each embodiment described above, reliability of inspection of the ultrasonic probe can be improved by satisfactorily separating the reflected signal from the undesired signals in the ultrasonic diagnostic apparatus that is configured to inspect the ultrasonic probe by using the reflected signal from the interface between the ultrasonic lens and the air.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An ultrasonic diagnostic apparatus, comprising:
   an ultrasonic probe including at least a plurality of ultrasonic transducers arranged in an array and an ultrasonic lens; and
   a main body configured to inspect the ultrasonic probe by using a reflected signal from an interface between the ultrasonic lens and air, the main body including inspection processing circuitry configured to:
      sequentially select an ultrasonic transducer to be inspected from the plurality of ultrasonic transducers, one by one, in such a manner that any two ultrasonic transducers being continuously selected are not spatially adjacent but are separated by a predetermined separation distance,
      cause the selected ultrasonic transducer to transmit an ultrasonic pulse,
      sequentially inspect each of the plurality of ultrasonic transducers by acquiring a reflected signal in response to transmission of the ultrasonic pulse from the interface,
      set a time gating for extracting a reflected signal of a multi-order echo resulting from two or more reflections of the ultrasonic pulse at the interface, and
      sequentially inspect each of the plurality of ultrasonic transducers by using amplitude information of one reflected signal among multi-order echoes extracted by the time gating.

2. The ultrasonic diagnostic apparatus according to claim 1, wherein the inspection processing circuitry is further configured to:
   set another time gating for extracting a reflected signal resulting from only one reflection of the ultrasonic pulse at the interface; and
   sequentially inspect each of the plurality of ultrasonic transducers by using amplitude information of the reflected signal extracted by the time gating.

3. The ultrasonic diagnostic apparatus according to claim 2, wherein the inspection processing circuitry is further configured to determine a position of the another time gating based on a distance between the selected ultrasonic transducer and the interface.

4. The ultrasonic diagnostic apparatus according to claim 1, wherein the inspection processing circuitry is further configured to determine a position of the time gating based on a distance between the selected ultrasonic transducer and the interface.

5. The ultrasonic diagnostic apparatus according to claim 1, wherein the inspection processing circuitry is further configured to:
   repeat processing of sequentially selecting and inspecting an ultrasonic transducer, one by one, from the plurality of ultrasonic transducers for a plurality of cycles;
   integrate a plurality of reflected signals obtained for each of the plurality of ultrasonic transducers through the plurality of cycles; and
   inspect each of the plurality of ultrasonic transducers by using amplitude information of integrated reflected signals.

6. The ultrasonic diagnostic apparatus according to claim 1, further comprising an acoustic matching layer between the ultrasonic lens and the array of the plurality of ultrasonic transducers,
   wherein the inspection processing circuitry is further configured to determine an optimum value of a repetition frequency of the ultrasonic pulse based on at least one of:

a thickness of the ultrasonic lens;
a material of the ultrasonic lens;
a thickness of the acoustic matching layer;
a material of the acoustic matching layer;
a transmission frequency; or
a transmission voltage.

7. An ultrasonic diagnostic apparatus, comprising:
an ultrasonic probe including at least a plurality of ultrasonic transducers arranged in an array and an ultrasonic lens; and
a main body configured to inspect the ultrasonic probe by using a reflected signal from an interface between the ultrasonic lens and air, the main body including inspection processing circuitry configured to:
sequentially select an ultrasonic transducer to be inspected from the plurality of ultrasonic transducers, one by one, in such a manner that any two ultrasonic transducers being continuously selected are not spatially adjacent but are separated by a predetermined separation distance,
cause the selected ultrasonic transducer to transmit an ultrasonic pulse,
sequentially inspect each of the plurality of ultrasonic transducers by acquiring a reflected signal in response to transmission of the ultrasonic pulse from the interface, and
set the separation distance depending on a repetition frequency of the ultrasonic pulse.

8. The ultrasonic diagnostic apparatus according to claim 7, wherein the inspection processing circuitry is further configured to set the separation distance in such a manner that the separation distance becomes longer as the repetition frequency becomes higher.

9. A probe inspection apparatus configured to be connected to an ultrasonic probe including at least an ultrasonic lens and a plurality of ultrasonic transducers arranged in an array, and inspect the ultrasonic probe by using a reflected signal from an interface between the ultrasonic lens and air, the probe inspection apparatus comprising inspection processing circuitry configured to:
sequentially select an ultrasonic transducer to be inspected from the plurality of ultrasonic transducers, one by one, in such a manner that any two ultrasonic transducers being continuously selected are not spatially adjacent but are separated by a predetermined separation distance;
cause a selected ultrasonic transducer to transmit an ultrasonic pulse;
sequentially inspect each of the plurality of ultrasonic transducers by acquiring a reflected signal from the interface in accordance with transmission of the ultrasonic pulse,
set a time gating for extracting a reflected signal of a multi-order echo resulting from two or more reflections of the ultrasonic pulse at the interface, and
sequentially inspect each of the plurality of ultrasonic transducers by using amplitude information of one reflected signal among multi-order echoes extracted by the time gating.

10. The probe inspection apparatus according to claim 9, further comprising a data transmission circuit configured to transmit an inspection result of the ultrasonic probe to an ultrasonic diagnostic apparatus that includes the ultrasonic probe.

11. A probe inspection apparatus configured to be connected to an ultrasonic probe including at least an ultrasonic lens and a plurality of ultrasonic transducers arranged in an array and inspect the ultrasonic probe by using a reflected signal from an interface between the ultrasonic lens and air, the probe inspection apparatus comprising inspection processing circuitry configured to:
sequentially select an ultrasonic transducer to be inspected from the plurality of ultrasonic transducers, one by one, in such a manner that any two ultrasonic transducers being continuously selected are not spatially adjacent, but are separated by a predetermined separation distance;
cause a selected ultrasonic transducer to transmit an ultrasonic pulse;
sequentially inspect each of the plurality of ultrasonic transducers by acquiring a reflected signal from the interface in accordance with transmission of the ultrasonic pulse; and
set the separation distance depending on a repetition frequency of the ultrasonic pulse.

* * * * *